April 24, 1934. J. W. BISHOP 1,955,939
PHONOGRAPH
Filed March 9, 1931 12 Sheets-Sheet 1

Inventor
Joseph W. Bishop
By W. E. Beatty Atty

April 24, 1934.  J. W. BISHOP  1,955,939
PHONOGRAPH
Filed March 9, 1931  12 Sheets-Sheet 2

Inventor
Joseph W. Bishop
By W. L. Beatty Atty.

April 24, 1934.   J. W. BISHOP   1,955,939
PHONOGRAPH
Filed March 9, 1931   12 Sheets-Sheet 3
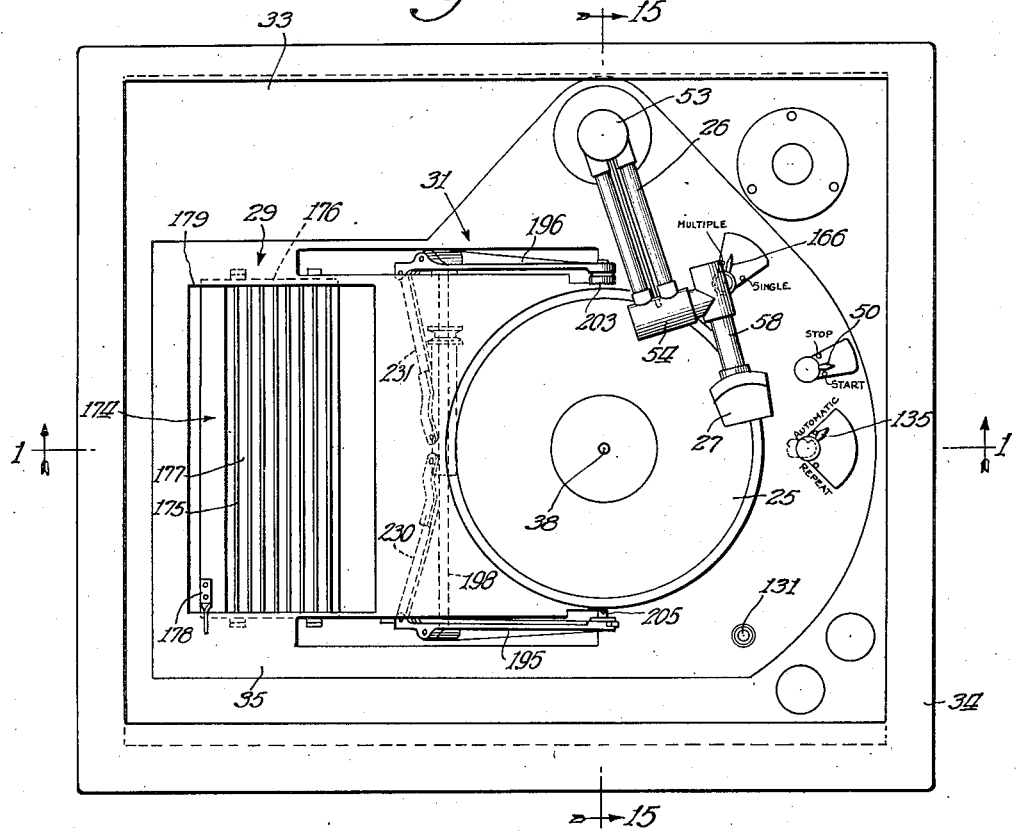
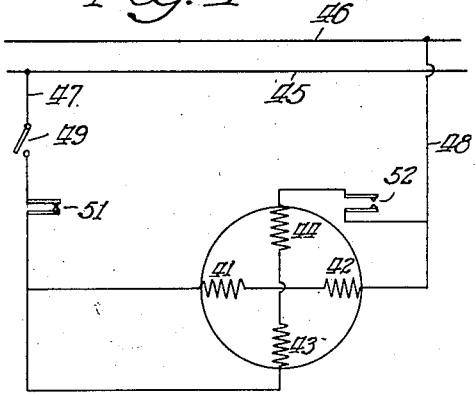
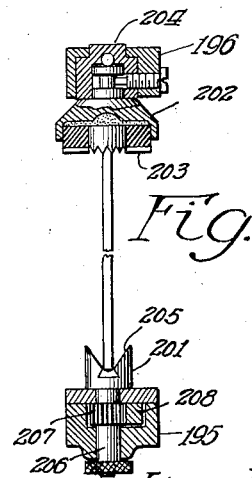
Inventor
Joseph W. Bishop
By W E Beatty   Atty.

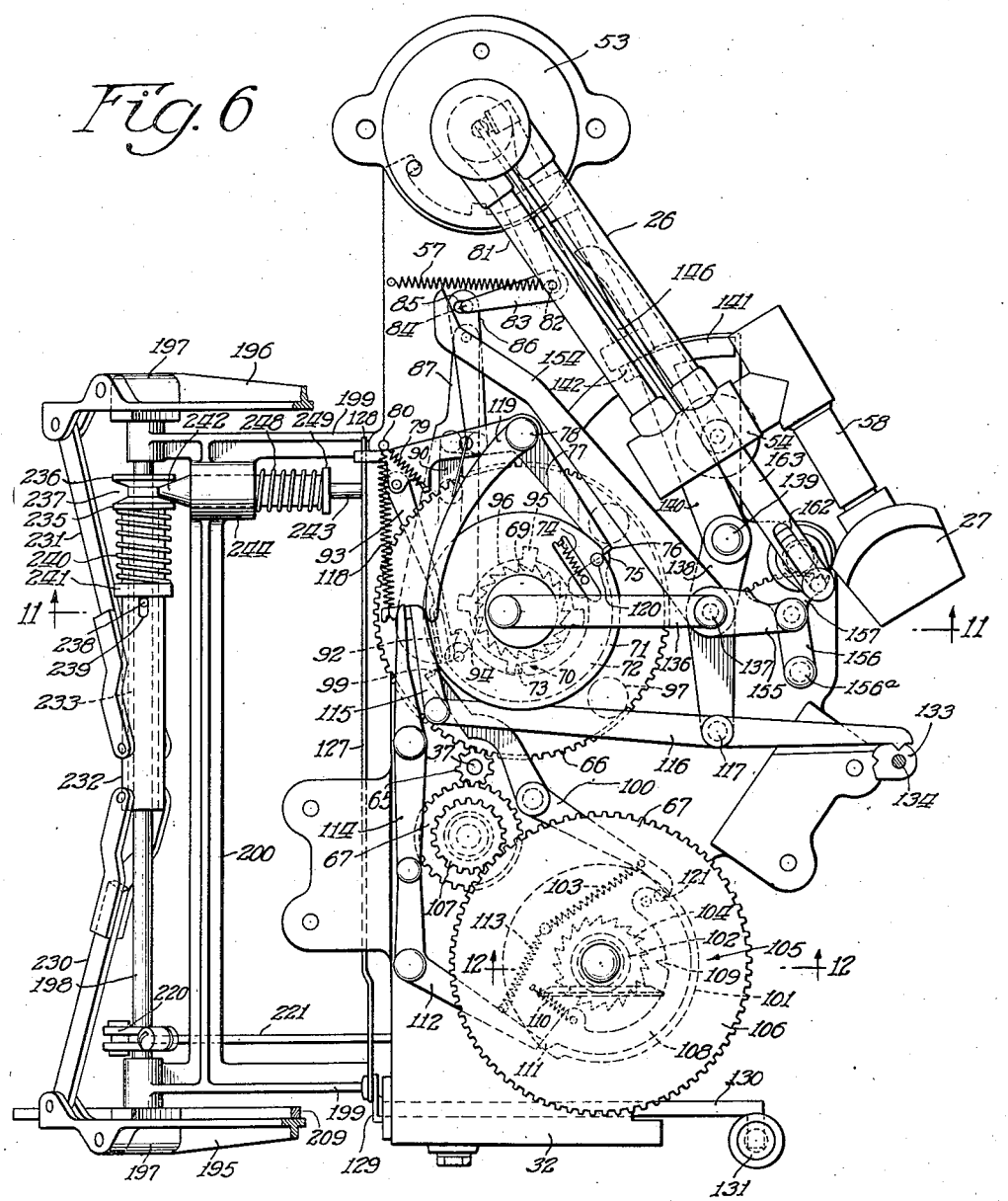

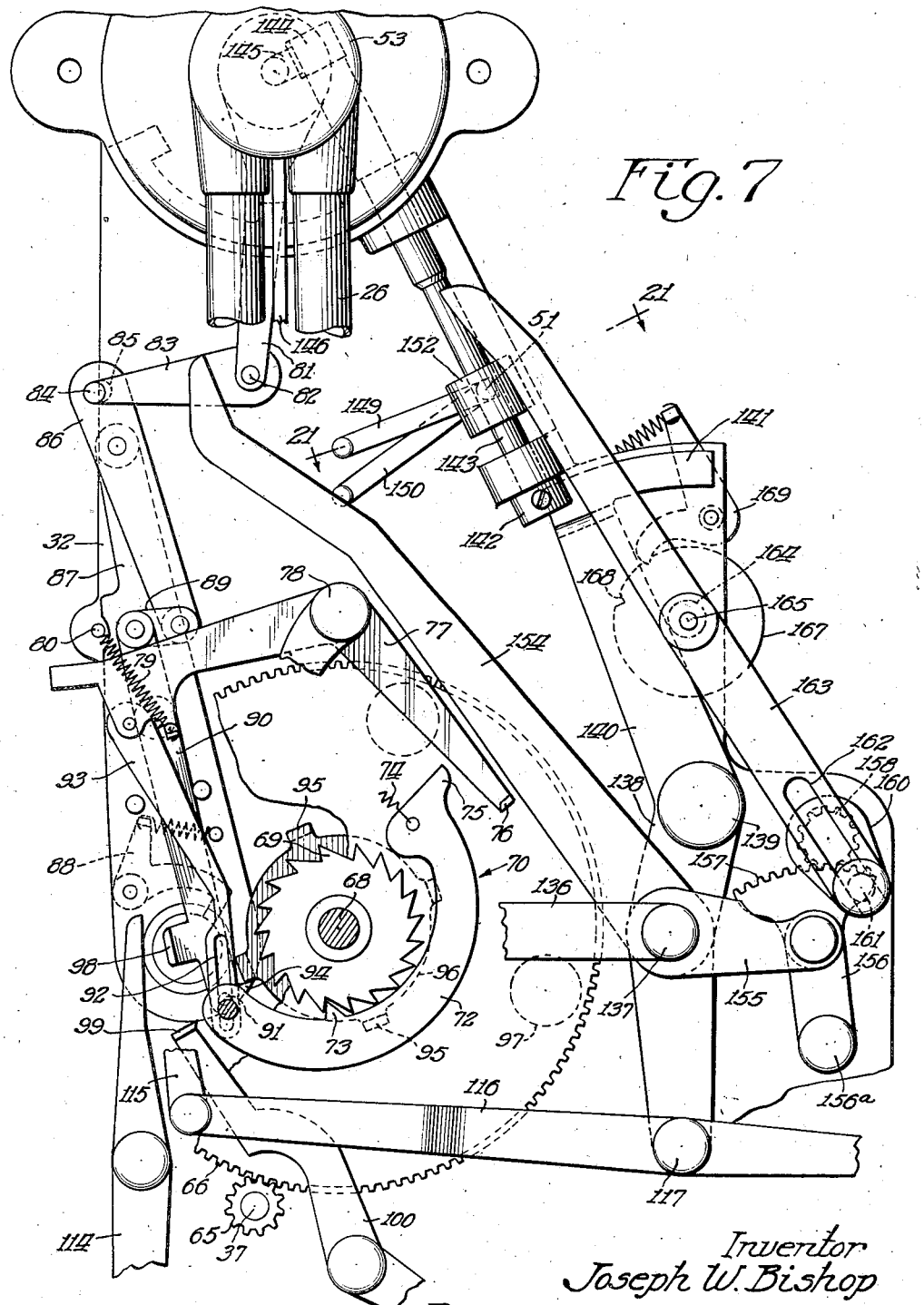

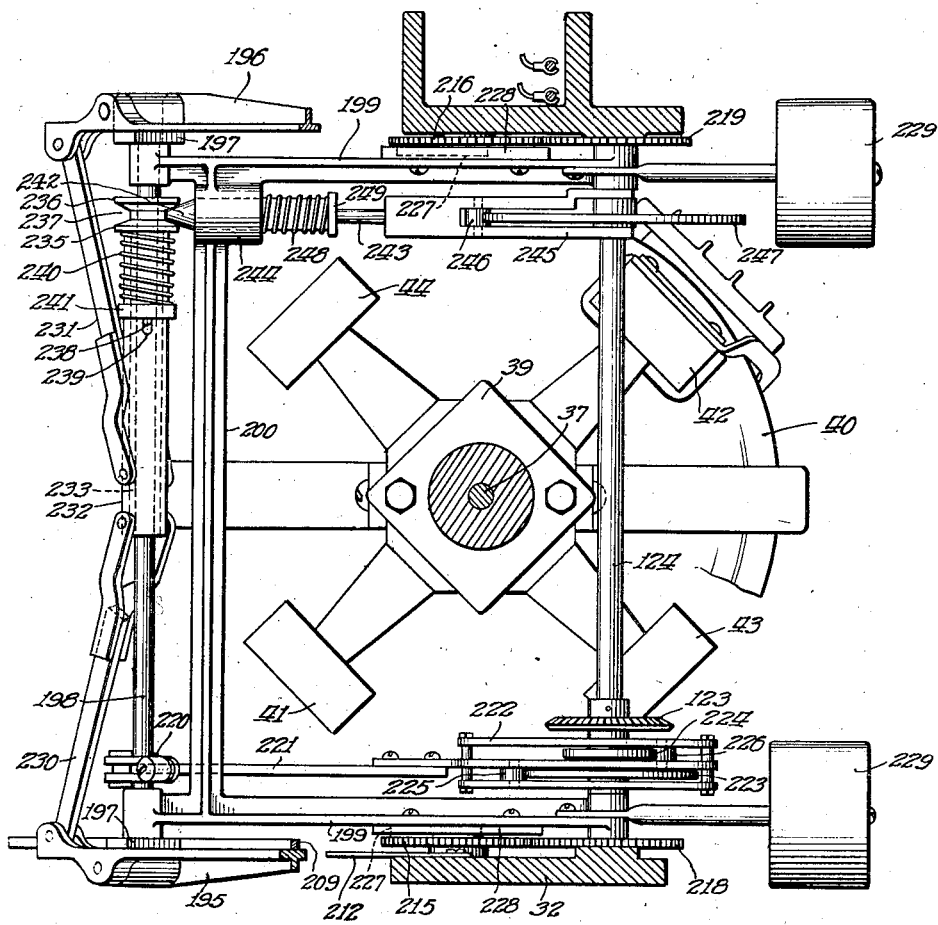

April 24, 1934.    J. W. BISHOP    1,955,939
PHONOGRAPH
Filed March 9, 1931    12 Sheets-Sheet 7

Inventor
Joseph W. Bishop
By W. E. Beatty Atty

April 24, 1934. J. W. BISHOP 1,955,939
PHONOGRAPH
Filed March 9, 1931 12 Sheets-Sheet 8

Inventor
Joseph W. Bishop
By
W E Beatty Atty

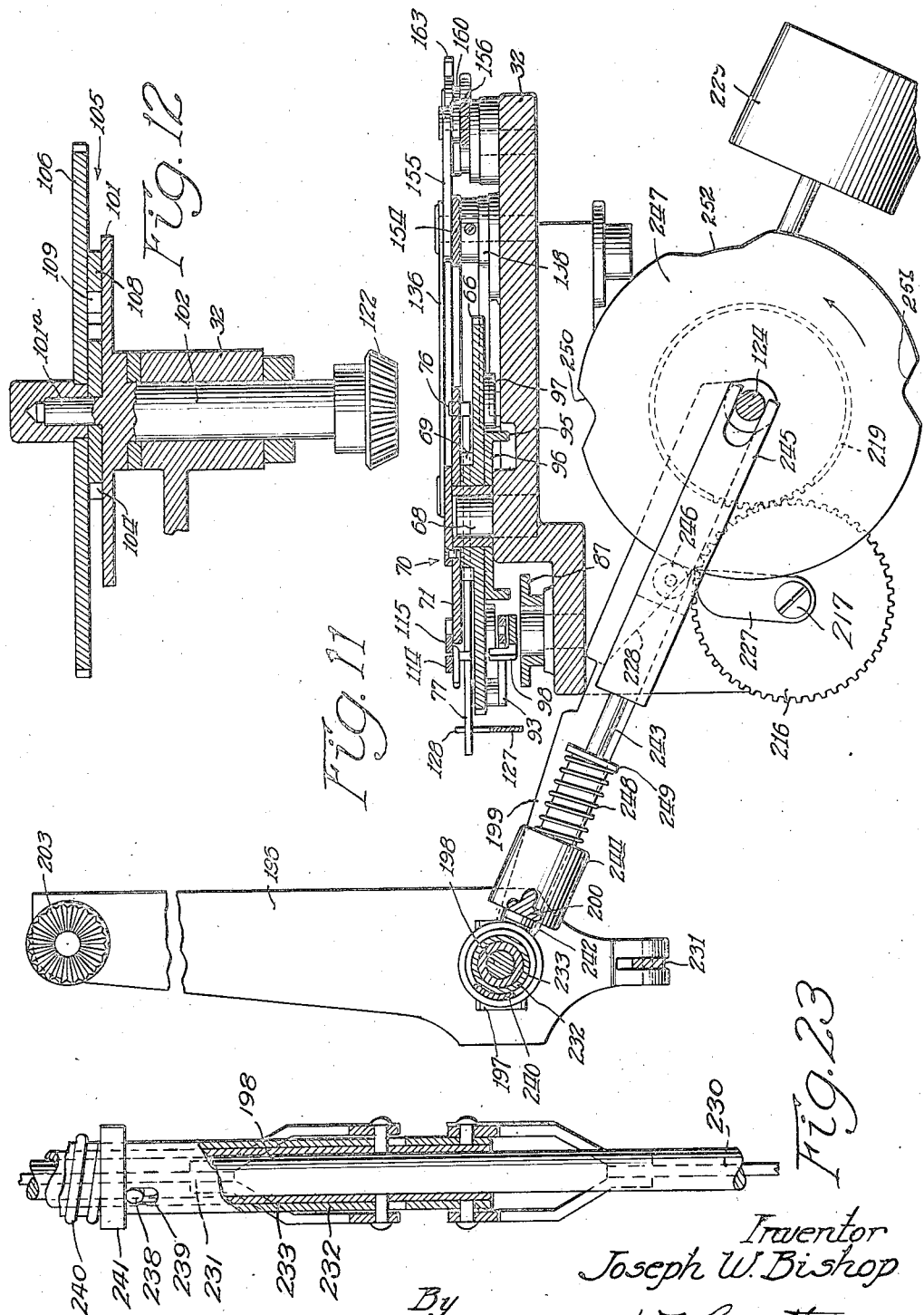

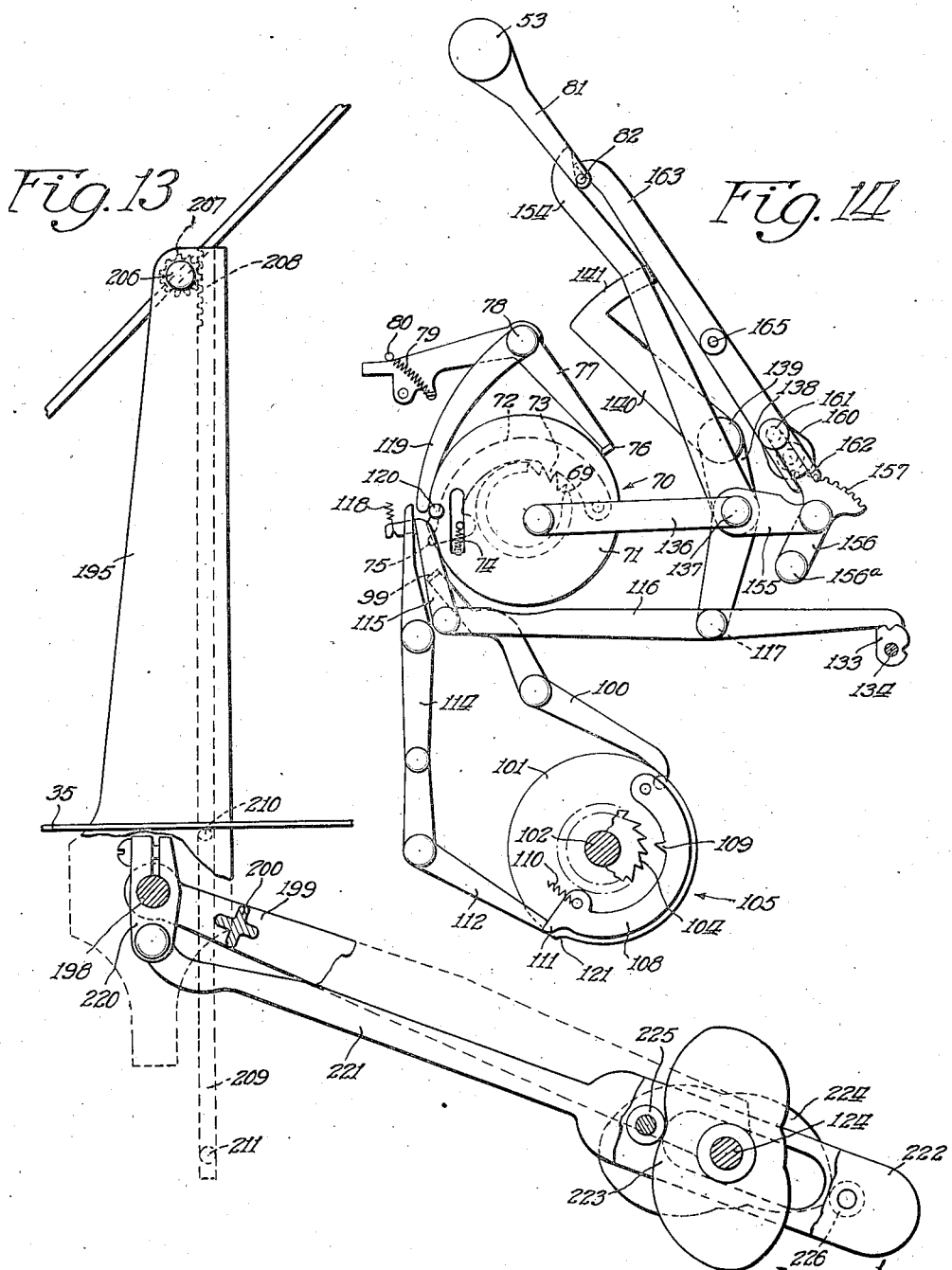

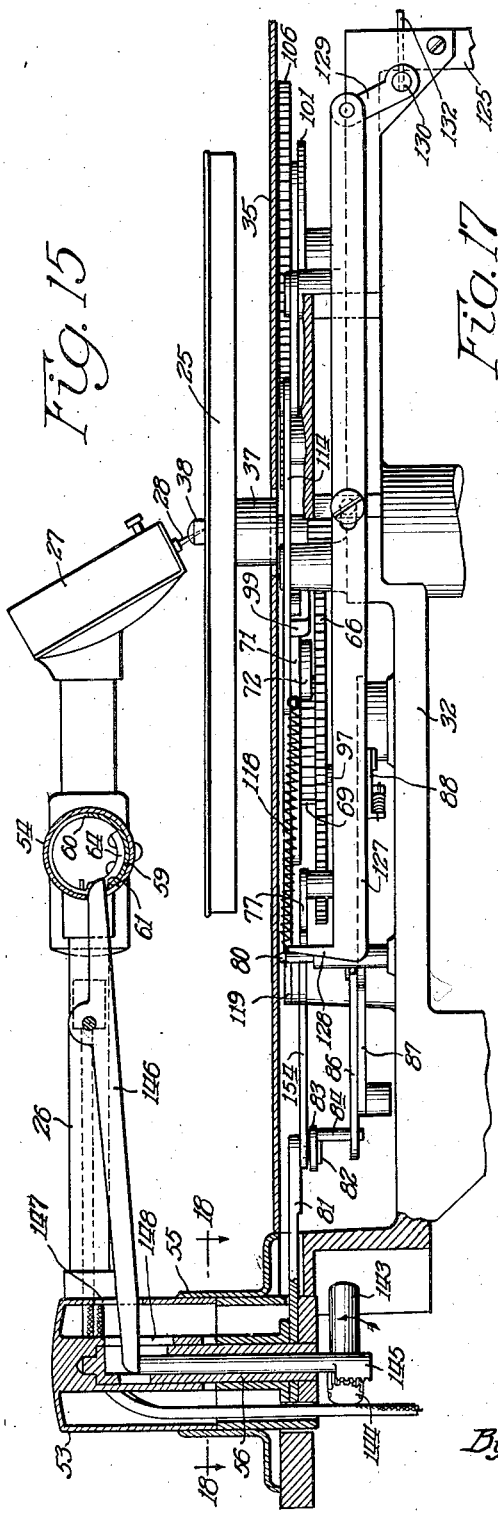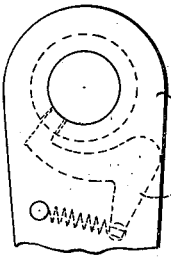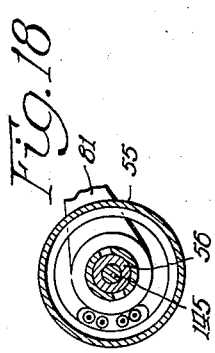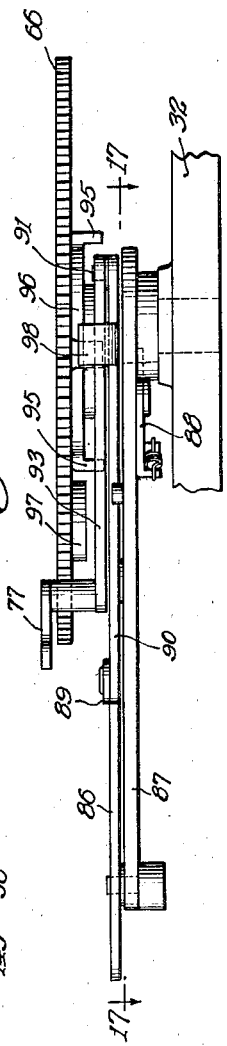

April 24, 1934.                J. W. BISHOP                1,955,939
                                PHONOGRAPH
                            Filed March 9, 1931          12 Sheets-Sheet 12

Inventor
Joseph W. Bishop
W E Beatty Atty.
By

Patented Apr. 24, 1934

1,955,939

UNITED STATES PATENT OFFICE 1,955,939

PHONOGRAPH

Joseph W. Bishop, Muskegon Heights, Mich., assignor to United Research Corporation, Long Island City, N. Y., a corporation of Delaware Application March 9, 1931, Serial No. 521,049

26 Claims. (Cl. 274—10)

The present invention relates generally to improvements in phonographs, and more particularly to phonographs capable of automatically playing a number of disk records in succession.

The invention is embodied in a phonograph having a turntable and a record magazine for supporting a plurality of records. A tone arm is movable over the turntable and carries a sound box with a stylus adapted to be brought into and out of engagement with the record on the turntable. Various coacting means are provided for transferring records one by one from the magazine onto the turntable, and discharging the played records from the turntable.

One of the primary objects of the present invention resides in the provision of a novel phonograph capable of automatically playing the records on both sides.

Another object is to provide a new and improved phonograph comprising means operable alternately to reverse a given record on the turntable and to effect a change of records.

Still another object is to provide novel record reversing and changing means which is adapted to be rendered operable automatically at the completion of the playing of either side of the record on the turntable or manually at any desired time.

A further object is to provide a novel phonograph comprising means automatically operable to increase the power of the driving motor whenever the means for reversing or changing records is in operation.

Still another object is to provide a new and improved phonograph which is adjustable at will either to play a plurality of records on both sides in succession, or one side of a given record repeatedly or merely one side of a given record.

A more specific object is to provide novel means for automatically stopping the operation of the phonograph when the last record of a series has been played and also upon adjustment of the phonograph to play only one side of a given record when said side has been played.

Various other objects of the invention reside in the provision in a phonograph of novel means for elevating the stylus from the record, novel means for positioning the tone arm, novel means for supporting and presenting a series of records to be played, novel means for transferring a new record to the turntable, reversing the record after the first side has been played and discharging the record after both sides have been played, and novel non-set means for automatically instituting the operation of the foregoing means upon the completion of the playing of either side of a record.

Other objects and advantages will become apparent as the description proceeds.

In the accompanying drawings, Figure 1 is a vertical sectional view, with the operating mechanism in elevation, taken along the line 1—1 of Fig. 3 of a phonograph embodying the features of my invention.

Fig. 3 is a plan view.

Fig. 4 is a diagrammatic representation of the electric circuits.

Fig. 5 is a fragmentary detailed sectional view of the record reversing and changing means.

Fig. 6 is a fragmentary plan view of the operating mechanism, with the parts in idle position.

Fig. 7 is a fragmentary plan view similar to Fig. 6, but on an enlarged scale, and showing the non-set mechanism about to effect actuation of the primary clutch.

Fig. 8 is a fragmentary horizontal sectional view taken along line 8—8 of Fig. 1.

Fig. 11 is a vertical sectional view taken along line 11—11 of Fig. 6.

Fig. 12 is a vertical sectonal view taken along line 12—12 of Fig. 6.

Fig. 13 is a fragmentary view on an enlarged scale of the record reversing and changing means.

Fig. 14 is a fragmentary plan view of the operating mechanism, showing the parts adjusted for the repeat playing of a given record.

Fig. 15 is a side elevational view, partially in section along line 15—15 of Fig. 3, of the operating mechanism.

Fig. 16 is a side elevational view of the primary clutch, and the non-set mechanism.

Fig. 17 is a fragmentary plan view taken along line 17—17 of Fig. 16.

Fig. 18 is a horizontal sectional view taken along line 18—18 of Fig. 15.

Fig. 23 is a side elevational view, partly in section of the mechanism for operating the arms, one of which is shown in Fig. 22.

Figure 1:
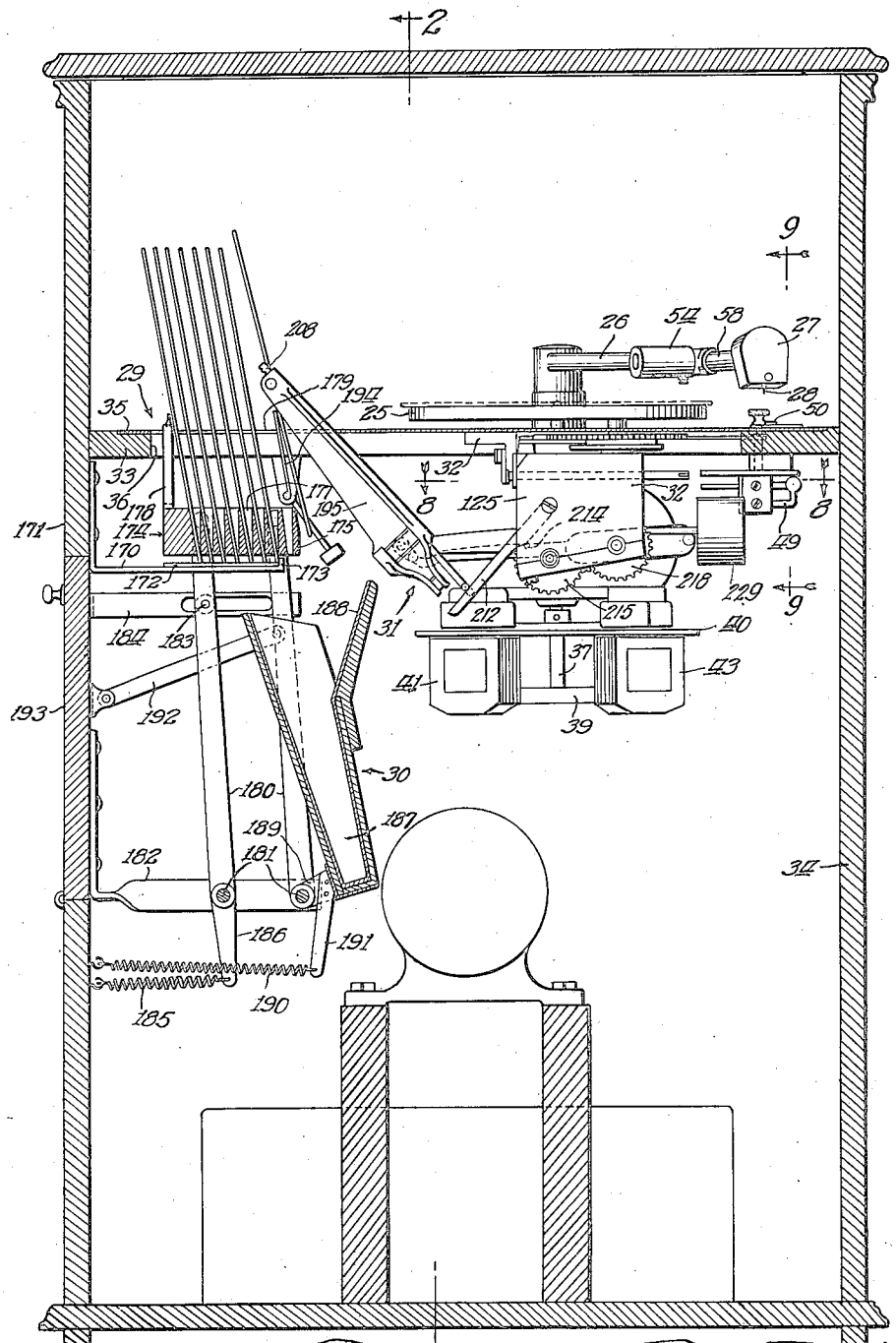

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the phonograph constituting the exemplary embodiment of the invention is of the type in which a plurality of records are played automatically in sequence. The phonograph in general comprises a suitable horizontal rotatable support or turntable 25, a horizontally swinging arm 26 designated for convenience as a tone arm, a pickup 27 carrying a stylus 28 and pivotally mounted on the free end of the arm 26, a record magazine 29 adapted to contain the records to be played, a discharge receptacle 30 for the played records, and a record handling mechanism 31 adapted to transfer a record from the magazine 29 onto the turntable 25, then remove, reverse and replace the record on the turntable, and finally discharge the record to the discharge receptacle 30.

Various units of the operating mechanism are mounted on a main frame 32 which is secured to the underside of a horizontal shelf 33 within a suitable cabinet 34. A cover plate 35 overlies an opening 36 in the shelf 33, and is suitably apertured to accommodate the magazine 29 and the operating mechanism.

The turntable 25 is removably mounted on the upper end of a vertical drive spindle 37 which is journaled in the frame 32 and the upper end of which extends through the cover plate 35 and is formed with an axial centering pin 38. Any suitable means may be provided for driving the spindle 37, and in the present instance this means comprises an induction motor 39 with a disk rotor 40. The motor coils are mounted on the underside of the frame 32 and the rotor 40 is secured to the lower end of the spindle 37.

In the present instance, the motor 39 (see Figs. 1, 4 and 8) comprises four coils 41, 42, 43 and 44, of which the coils 41 and 42 are connected across main terminals 45 and 46 by leads 47 and 48, and are normally constantly excited. Interposed in the lead 47 are a hand switch 49 mounted on the underside of the shelf 33 and having an actuator 50 extending above the cover plate 35, and a switch 51 adapted to be opened automatically as hereinafter described to stop the operation of the motor 39 when no record is positioned on the turntable 25. The coils 43 and 44 are connected across the leads 47 and 48 in parallel to the coils 41 and 42, the connection including a switch 52 normally open, but adapted to be closed automatically as hereinafter described to increase the power of the motor 39 during the record reversing or changing operation.

The tone arm and pickup

Figure 9:
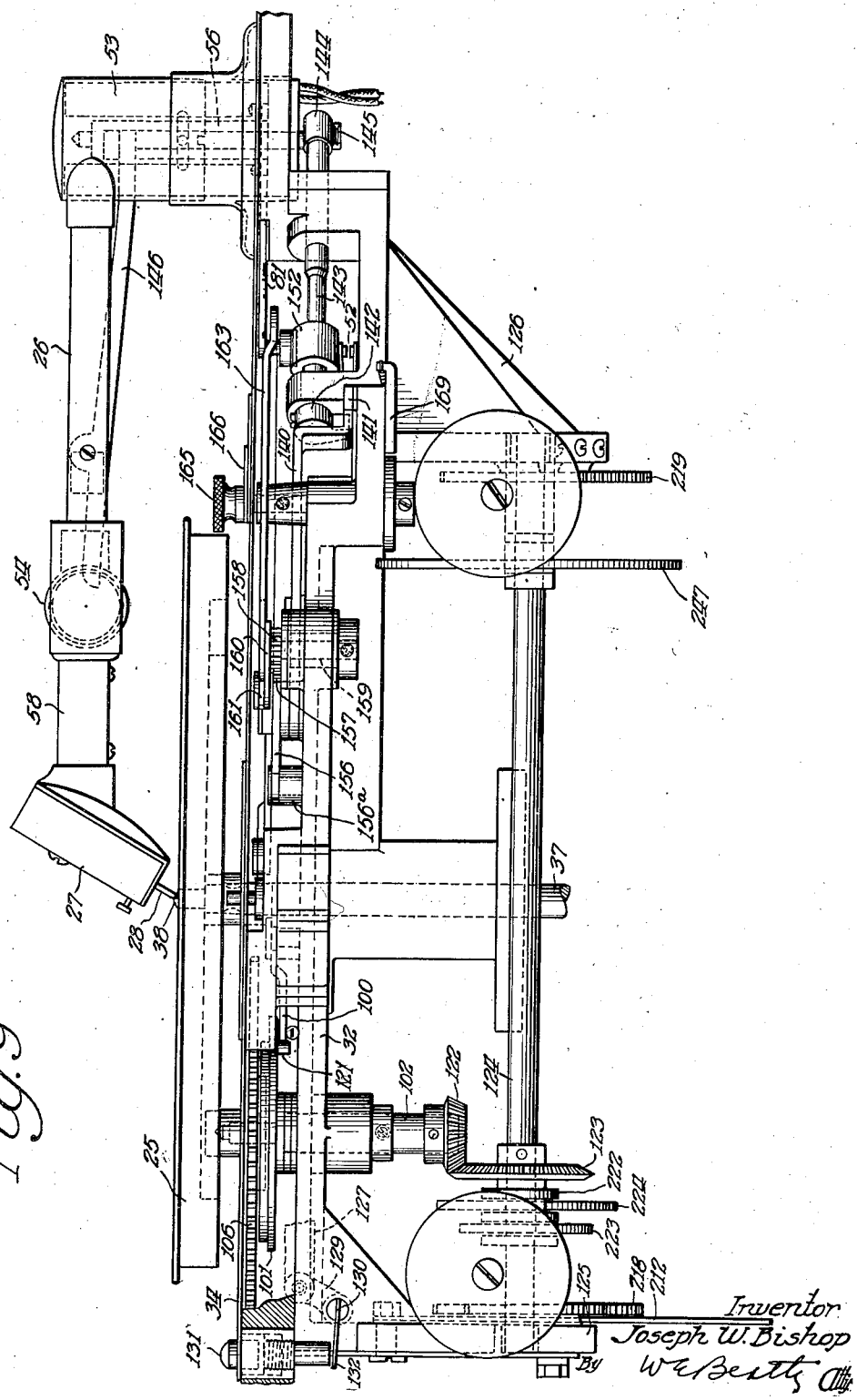
Fig. 9 is a side elevational view on an enlarged scale of the operating mechanism.
Figure 10:
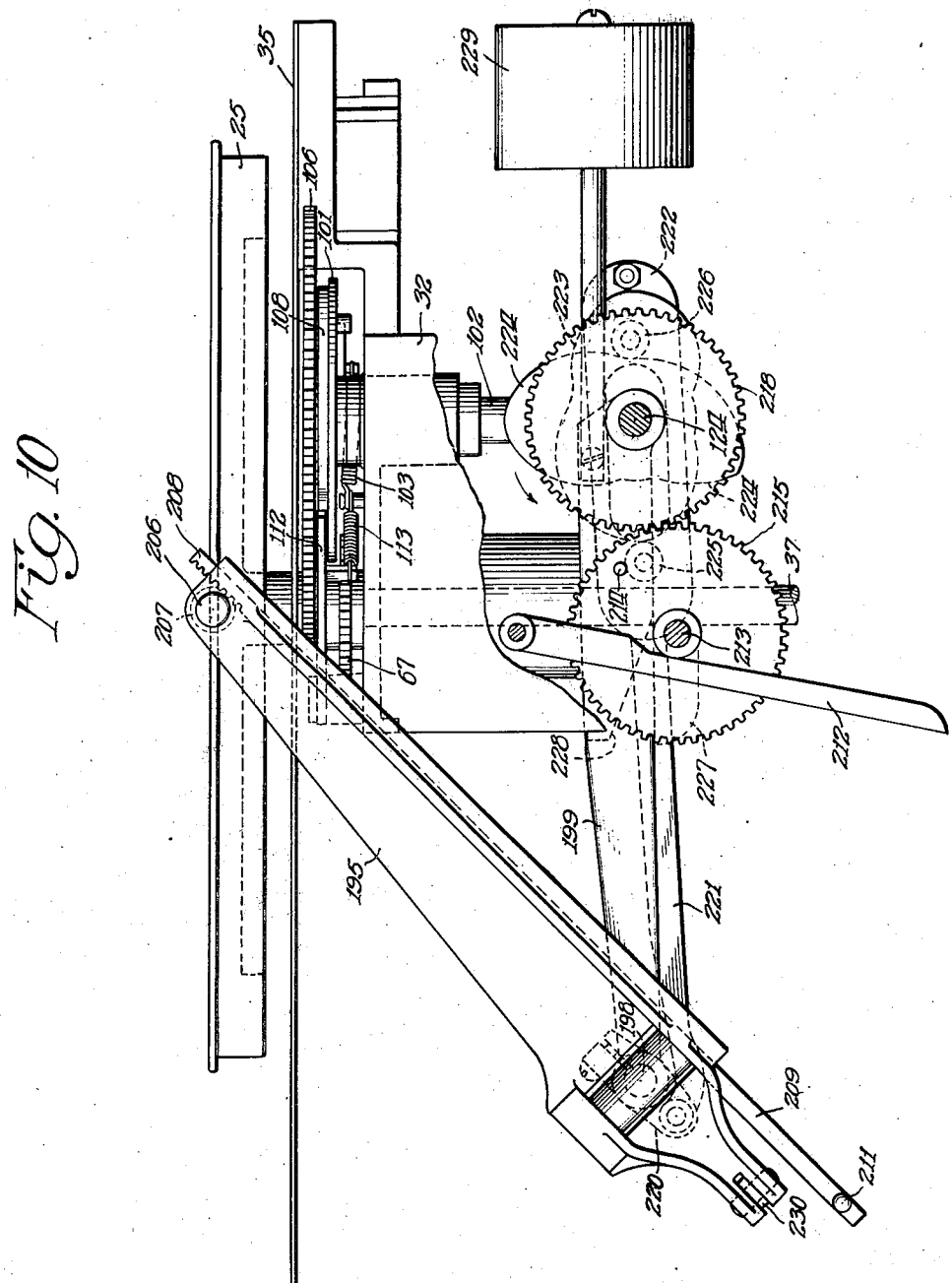
Fig. 10 is a front elevational view on an enlarged scale of the operating mechanism.

The tone arm 26 (see Figs. 6, 9 and 15) comprises two parallel horizontal tubular members which are fixed to an upright tubular hub portion 53 and which at their free ends support and communicate with a transverse sleeve 54. The hub portion 53 is rotatably mounted in a socket 55 on an extension of the cover plate 35 and is free to turn on a hollow pivot 56 secured to the frame 32. Normally, the tone arm 26 thus is mounted for free lateral swinging movement by engagement of the stylus 28 with the sound groove of the record being played except for the influence of a weak tension spring 57 which exerts a slight inward pull.

Figure 19:
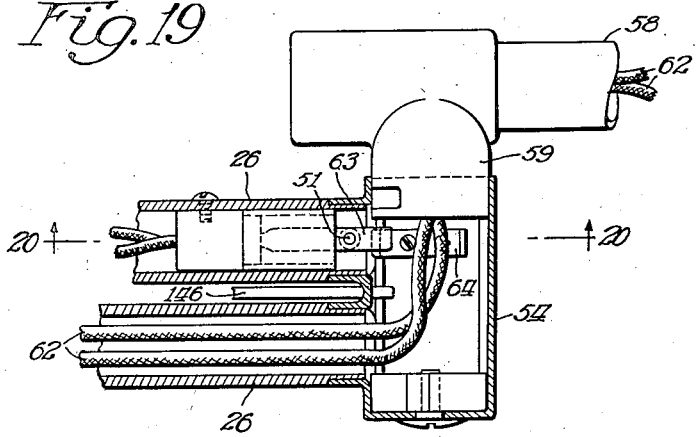
Fig. 19 is a fragmentary sectional view of the free end of the tone arm.
Figure 20:
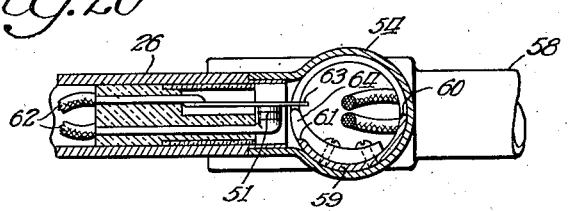
Fig. 20 is a fragmentary sectional view taken along line 20—20 of Fig. 19.

The pickup 27 (see Figs. 19 and 20) is mounted on a T-shaped tubular member 58 of which one arm 59 is rotatably mounted in the sleeve 54. The arm 59 is cut away in its upper portion and intermediate its ends as indicated at 60, thus defining an upwardly facing longitudinal edge 61. Suitable electrical leads 62 extend from the pickup 27 through the member 58, the sleeve 54, one of the members of the tone arm 26, and the hub portion 53 to the horn (not shown).

Mounted in the other member of the tone arm 26 is the switch 51 which is normally closed, and of which one contact is mounted on a spring arm 63 extending into the sleeve 54 and the arm 59. An abutment 64 secured in the arm 59 is movable into engagement with the arm 63 to open the switch 51 upon lowering the pickup 27 below its normal playing position as when no record is positioned on the turntable 25 to limit its movement.

Clutch drives

Various clutch drives are provided for elevating the pickup 27, positioning the tone arm 26 and actuating the record reversing and changing means. While these drives may derive power from any suitable source, preferably they are connected to the main spindle 37. To this end, a pinion 65 fast on the spindle 37 is constantly in mesh with two gears 66 and 67.

The gear 66 (see Figs. 6, 7 and 11) is rotatable on a stud 68 on the frame 32, and is formed on its upper surface with a coaxial ratchet 69 which constitutes one element of a master clutch 70. A circular drive disk 71 is rotatably mounted on the stud 68 directly over and against the ratchet 69. An arcuate clutch shoe 72 is pivoted at one end on the underside of the disk 71, and is formed intermediate its ends with a clutch tooth 73 adapted for engagement with the ratchet 69 to establish a drive connection from the spindle 37 to the disk 71. A coiled tension spring 74 tends to establish this engagement.

The free end of the shoe 72 is formed with a lug 75 projecting beyond the periphery of the disk 71 and normally engaged by a detent 76 to hold the clutch 70 open. The detent 76 is formed on one arm of a bell crank lever 77 pivoted on a stud 78, the other arm of which is held by a spring 79 against a stop 80.

The free arm of the lever 77 is adapted to be actuated against the tension of the spring 79 to effect closing of the clutch 70 whenever the stylus 28 reaches the end of the sound groove on the record being played. The means for this purpose is in the nature of a non-set means effective to actuate the lever 77 when the tone arm 26 ceases its inward movement, and in its preferred form comprises a lateral arm 81 secured to the sleeve 56. Rigid with a depending pin 82 on the free end of the arm 81 is an arm 83 having a depending pin 84 at its opposite end. The pin 84 extends through a slot 85 in one end of a lever 86 pivoted intermediate its ends on the free end of a base lever 87 pivoted at its other end on the frame 32. A spring pressed friction brake 88 (see Fig. 17) is mounted in engagement with the pivot of the lever 87.

Movement of the tone arm 26 is thus effective through the lever 86 to swing the base lever 87.

The end of the lever 86 opposite the pin and slot connection with the arm 83 is connected through a pivotal link 89 to the short end of the lever 90 fulcrumed on the base lever 87. The long end of the lever 90 has an upstanding pin 91 which extends through a longitudinal slot 92 formed in the free end of a link 93 pivotally secured to the free arm of the bell-crank lever 77. Also formed on the free end of the link 93 is a hook 94 adapted for engagement by one or another of a plurality of peripherally spaced depending lugs 95 on a disk 96 secured to the underside of the constantly rotating gear 66.

A plurality of circular cam abutments 97, four in the present instance, are provided on the underside of the gear 66 in uniformly spaced relation about the disk 96, and are adapted successively to engage an upstanding projection 98 on the lever 90 to cam the hook 94 periodically into position for engagement by the next lug 95. The hook 94 normally will be retracted before such engagement can occur provided the tone arm 26 is moving inwardly. However, when the stylus 28 reaches the end of the sound groove, or if special grooves are provided beyond the sound groove, the final circular or eccentric groove, the tone arm 26 will cease to move inwardly, and thereupon the hook 94 remains in the forward position. Upon engagement of the hook 94 by one of the lugs 95, the link 93 will be drawn forward, thus actuating the detent 76 to effect automatic closing of the clutch 70.

A second detent 99 diametrically opposed to the detent 76 is disposed in the path of the lug 75, and upon engagement therewith is effective to open the clutch 70, and thereby stop rotation of the disk 71 after one-half revolution. The detent 99 is rigid with one end of a lever 100 pivoted intermediate its ends on the frame 32. The other end of the lever 100 coacts with a rotary cam disk 101 (see Figs. 6 and 12) having a depending shaft 102 rotatable in the frame 32. A tension spring 103 tends to urge the lever 100 yieldingly toward the disk 71.

Rotatably disposed on an axial upstanding pin 101ᵃ rigid with the disk 101 is a ratchet 104 constituting one element of a secondary clutch 105. A gear 106 coaxial and rigid with the ratchet 104 meshes with a gear 107 coaxial and rigid with the gear 67, thus establishing a continuous driving connection from the spindle 37 to the ratchet 104. Pivoted at one end on the disk 101 is an arcuate clutch shoe 108 having a tooth 109 intermediate its ends adapted for engagement with the ratchet 104. A spring 110 tends to establish this engagement. The free end of the shoe 108 is formed with a trip lug 111 projecting beyond the periphery of the disk 101 for engagement with the free end of one arm of a bell-crank lever 112 pivoted on the frame 32 to effect opening of the clutch 105. A spring 113 urges the lever 112 into the path of the lug 111 at a point substantially opposite the free end of the lever 100. The other arm of the bell-crank lever 112 is pivotally connected to one end of a lever 114 pivoted intermediate its ends on the frame 32, and having its other end lying adjacent an arm 115 pivoted on one end of a lever 116 pivoted at 117 on the frame 32. The arm 115 rests on the disk 71, and normally is held out of contact with the lever 114 by a spring 118. A curved arm 119 loosely pivoted at 78 likewise rests on the disk 71 and is adapted for engagement by a pin 120 on the disk upon rotation of the latter from idle position approximately through one-half revolution to cam the arm 115 outwardly against the lever 114 and thereby actuate the detent 112 to effect closing of the clutch 105. It will be evident that the disk 101 will thereupon be driven through one complete revolution.

Provided near the periphery of the disk 101 is a depending cam projection 121 adapted upon rotation of the disk through 360° to engage the lever 100, and thereby withdraw the detent 99 to effect closing of the clutch 70 for the last half revolution of the disk 71.

The shaft 102 (see Fig. 9) has a gear 122 on its lower end meshing with a gear 123 on a shaft 124 journaled in front and rear depending end brackets 125 and 126 on the frame 32. The gear ratio is such that for each complete revolution of the disk 101, the shaft 124 will be rotated through one-half revolution. The disk 71 thus constitutes the drive element for the tone arm 26 and the pickup 27, and serves also to institute operation of the disk 101; the latter controls the stop and start of the disk 71 after approximately one-half revolution; and the shaft 124 driven with the disk 101 constitutes the drive element for the record reversing and changing means.

In operation, upon movement of the tone arm 26 into its innermost position, the detent 76 is withdrawn to effect closing of the clutch 70. In the course of this initial rotation, the disk 71 serves to elevate the pickup 27 and swing the tone arm 26 outwardly beyond the record as hereinafter described, and then to cause withdrawal of the lever 112 to effect closing of the secondary clutch 105. The disk 101 immediately moves the lug 121 out of engagement with the lever 100, thus releasing the detent 99 into position for engagement by the lug 75 to open the clutch 70 after approximately one-half revolution.

The shaft 124 now is driven to reverse the record or change records. After one revolution of the disk 101, the detent 112 is effective to open the clutch 105. The detent 99 is withdrawn through engagement of the lug 121 with the lever 100, whereupon the disk 71 completes its revolution to swing the tone arm 26 inwardly into initial playing position, and to lower the pickup 27.

Means is provided for instituting the operation manually at any desired time, and in the present instance, this means (see Figs. 3, 6, 9 and 15) comprises a bar 127 slidably mounted on the frame 32, and formed on one end with a hook 128 adapted for engagement with the free arm of the detent lever 77. The other end of the bar 127 is connected through a crank arm 129 to a rock shaft 130 journaled in the frame 32. Slidably mounted on the shelf 33 and extending above the cover plate 35 for manual actuation is a spring pressed rejector button 131 which is adapted to be depressed into engagement with an underlying arm 132 on the shaft 130 to rock the latter and thereby institute closing of the clutch 70 and the resulting operations.

Means is available at will for preventing actuation of the clutch 105 without affecting the operation of the clutch 70 so as to adapt the phonograph for playing one side of a record repeatedly. In the present instance this means (see Figs. 3, 6 and 14) comprises a rotary cam 133 secured to a shaft 134 and coacting with the free end of the lever 116. Secured to the upper end of the shaft 134 is an indicator 135 adjustable into "automatic" position or "repeat" position. With the indicator 135 in "automatic" position (see Fig. 6), the arm 115 is disposed in the path of the arm 119. With the indicator in "repeat" position (see Fig. 14), the arm 115 is disposed out of the path of the arm 119 which thus is free to oscillate without effecting actuation of the lever 114. In the repeat adjustment, the detent 99 is held out of the path of the lug 75 so as to permit the disk 71 to make a complete uninterrupted revolution.

Means for elevating pickup

The means for elevating the pickup 27 (see Figs. 6, 7, 9 and 15) preparatory to reversing a given record or changing records, comprises a link 136 eccentrically pivoted at one end to the drive disk 71, and pivotally connected at its other end at 137 to a lever 138. The latter is pivotally mounted at 139 on the frame 32, and has a downwardly extending arm 140 formed on its free end with an arcuate track 141. A cam 142 fast on one end of a shaft 143 journaled in the frame 32 is adapted to be engaged and supported by the track 141. The other end of the shaft 143 has a segmental gear 144 which meshes with a vertical rack bar 145 slidable in the hollow pivot 56 in the hub portion 55 of the tone arm 26.

Pivoted intermediate its ends and between the parallel members of the tone arm 26 is a lever 146, one end of which extends through alined openings 147 and 148 formed respectively in the hub portion 55 and the sleeve 56 into position for engagement by the upper end of the rack 145, and the other end of which extends into the sleeve 54 into operative engagement with the longitudinal edge 61 of the arm 59 supporting the pickup 27.

It will be evident that upon rotation of the drive disk 71 through the first 180°, the lever 140 will be swung inwardly, thus bringing the track 141 into engagement with the cam 142 to rotate the shaft 143 in a direction to effect elevation of the rack 145. The latter acting through the lever 146, serves to elevate the pickup 27, and support same in elevated position during the intermediate idle period of the drive disk 71. During the subsequent rearward movement of the tone arm 26, the track 141 slides along the cam 142 and maintains the pickup 27 in elevated position.

Upon continued rotation of the drive disk 71 through the last half of its revolution, the lever 140 is returned to its initial position, thus moving the track 141 outwardly. As the tone arm 26 reaches the appropriate position, the cam 142 drops off the track 141 to release the pickup 27 into engagement with the sound groove.

Figure 21:
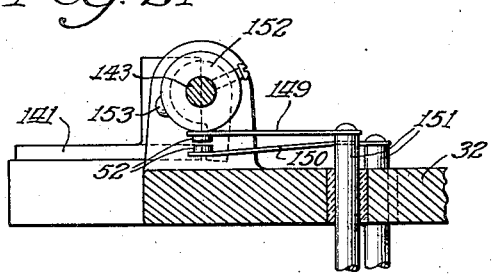
Fig. 21 is a fragmentary sectional view taken along line 21—21 of Fig. 7.
Figure 22:
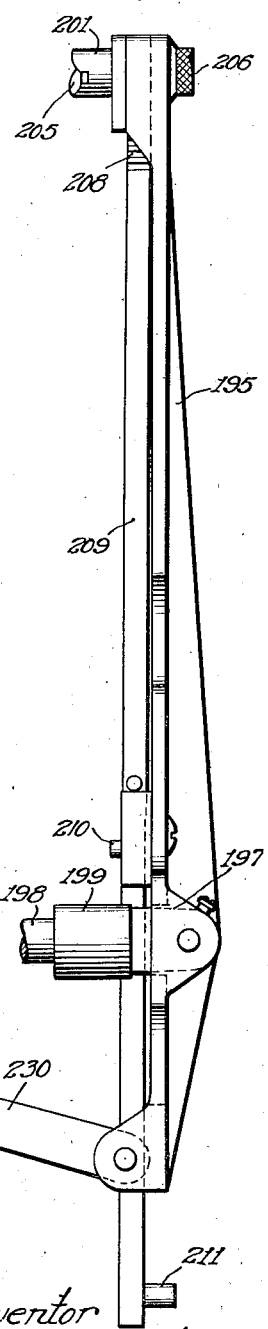
Fig. 22 is a side view of one of the arms of the record reversing and changing means.

Since elevation of the pickup 27 represents the initial step in each cycle of operation, rotation of the shaft 143 is utilized to close the switch 52 to increase the power of the motor 39 for subsequent steps in the operation. To this end, the contacts of the switch 52 are mounted on the free ends of two spring arms 149 and 150 (see Fig. 21), supported on suitable terminal ports 151 in the frame 32, and are normally spaced apart. A peripheral collar 152 adjustably secured to the shaft 143 is provided with a projection 153 movable into engagement with the arm 149 to close the switch contacts when the shaft is rotated to elevate the pickup 27. On lowering the pickup 27, the switch 52 is again opened.

Means for actuating tone arm

The means (see Figs. 6, 7, 14 and 15) for restoring the tone arm 26 to initial position after a change of records or reversing a given record, is driven from the disk 71, and comprises a lever 154 pivotally mounted at one end on the stud 117, and pivotally connected intermediate its ends to the link 136. The free end of the lever 154 extends across the depending pin 82 and is adapted to engage the latter to swing the tone arm 26 outwardly, after elevation of the pickup 27, upon rotation of the disk 71 through its first half revolution.

A link 155 serves to pivotally connect the link 136 to a lever 156 pivoted on a stud 156ª on the frame 32. The lever 156 is formed on one end with a segmental gear 157 which meshes with a pinion 158 on a vertical stud shaft 159 journaled in the frame 32. Rigid with the pinion 158 is a crank arm 160 having an upstanding pin 161 engaging in a longitudinal slot 162 opening in one end of a lever 163 pivoted on a circular bearing 164. The free end of the lever 163 is adapted to engage the pin 82 to swing the tone arm 26 inwardly to a point where the stylus 28 is in position to engage the sound groove of the record.

The bearing 164 is eccentrically secured to a shaft 165 which is journaled in the frame 32, and is provided above the cover plate 35 with an indicator 166 movable into two positions identified by the legends "Single" and "Multiple". Upon adjustment of the indicator 166 into the "Multiple" position, the bearing 164 will be so adjusted that the lever 163 will return the tone arm 26 into initial playing position. However, in the other position, the bearing 164 will be so located that the tone arm 26 will not be returned into position over the record, and hence the pickup 27 will be lowered beyond its normal playing position due to failure to contact with a record. As a result, the switch 51 will be opened, thus stopping the machine after playing a single side of a record.

To prevent misadjustment, a circular disk 167 is coaxially secured to the shaft 165, and is formed in its periphery with two notches 168 adapted for engagement by a spring detent 169 in the respective positions of adjustment.

The record magazine

The records to be played are positioned in the magazine 29 (see Figs. 1, 2 and 3) which is located at one side of the turntable 25. In its preferred form, the magazine 29 comprises an elongated horizontal support 170 secured to the cabinet wall 171, and extending generally radially toward the turntable 25. A plate 172 constituting a track or guide is secured on the support 170, and the free end of the latter is struck up to define a stop lug 173.

Figure 2:
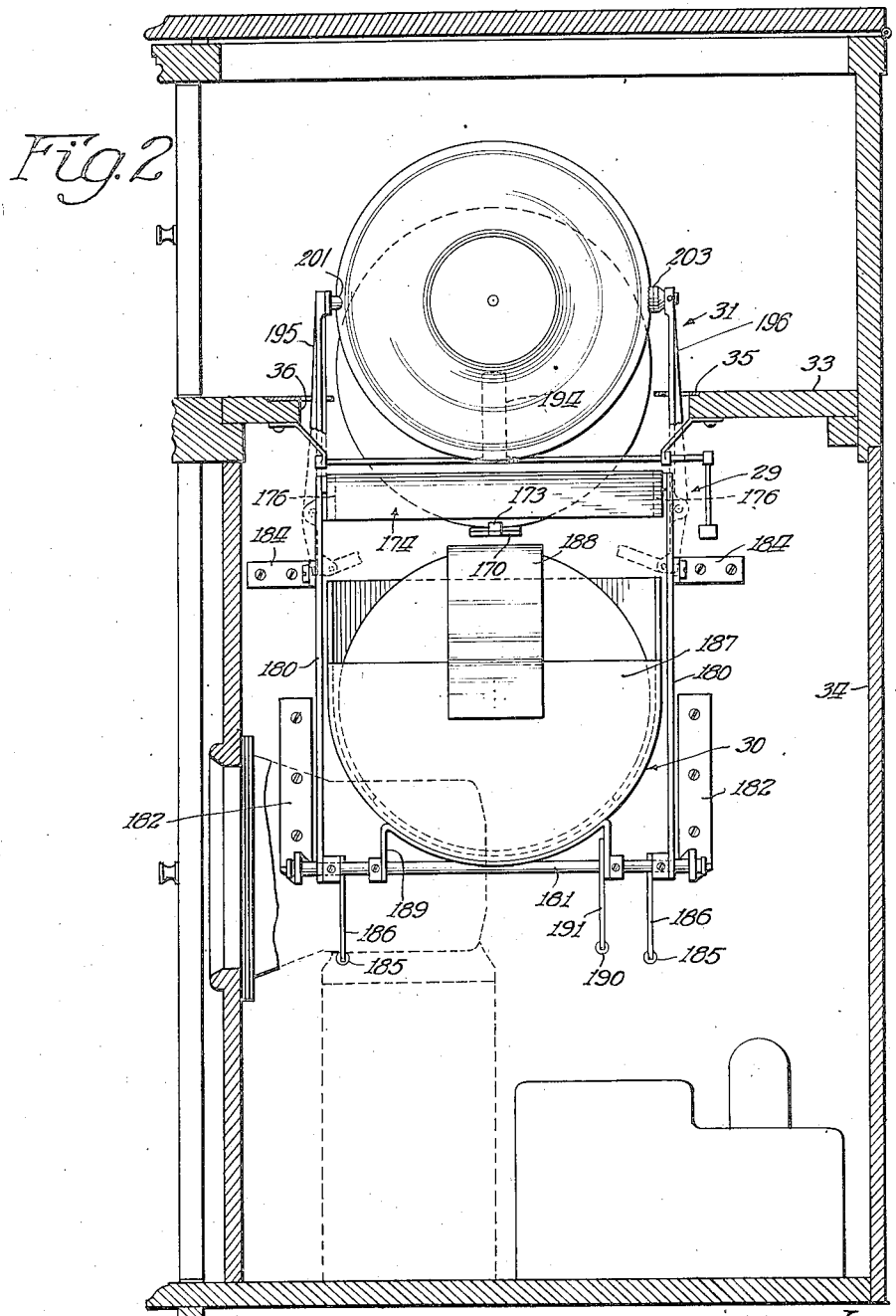
Fig. 2 is a vertical sectional view of the phonograph taken along the line 2—2 of Fig. 1.

A carriage 174 is mounted for a forward step-by-step movement along the top of the track 172, and preferably comprises a plurality of parallel spaced bars or slats 175 extending transversely of the track 172, and joined at the ends by suitable cross members 176 to form a unitary rack. The slats are positioned vertically and beveled upwardly on their forward sides to define a plurality of downwardly tapering pockets 177 adapted to receive and support a plurality of records as shown in Fig. 1 with the lower edges resting on the track 172. An upright backing member 178 is mounted on the carriage 174 behind the rearmost record. The records extend upwardly through the opening 36 in the shelf 33 and an opening 179 in the cover plate 35.

To movably support the carriage 174, a set of four parallel generally vertical levers 180 are pivotally secured at their upper ends to the cross members 176, and at their lower ends to two parallel horizontal rock shafts 181 journaled in two spaced brackets 182 on the cabinet wall 171. The two rearmost levers 180 have pin and slot connections 183 with two guide arms 184 on the cabinet wall 171 for guiding and limiting the carriage 174 in its movement. Coiled tension springs 185 acting on depending arms 186 on the rearmost shaft 181 tend to move the carriage 174 forwardly.

It will be evident that the foremost record will be held in fixed position against the stop lug 173 for transfer to the turntable 25, and that upon the removal of this record, the carriage 174 will be advanced one step to bring the succeeding record into the vacated position.

The discharge receptacle

The discharge receptacle 30 is mounted below the record magazine 29 and slightly in advance thereof in position to receive each record after final removal from the turntable 25, and comprises an upwardly opening container 187 having a forwardly inclined deflector wall 188. The container 187 is supported at its lower end by two spaced lugs 189 pivotally mounted on the foremost rock shaft 181. A coiled spring 190 anchored to the wall 171 and a depending finger 191 on the foremost shaft 181 tends to pivot the container 187 forwardly. The upper end of the container 187 is connected through two links 192 to the upper end of a door 193 hinged at its lower edge in the cabinet wall 171, and when closed serving to hold the container in upright position. When the door 193 is opened, the container 187 is tilted outwardly to facilitate removal of records therein.

Pivotally mounted in front of the record magazine 29 is a weighted arm 194 for directing the played records toward the container 187.

Record reversing and changing mechanism

The mechanism for reversing and changing records (see Figs. 6, 8, 10, 11, 13 and 22) comprises two parallel spaced arms 195 and 196 which are pivotally mounted intermediate their ends for movement of the upper ends toward and from each other respectively on two bearing blocks 197 secured to the ends of a horizontal rock shaft 198. The latter is journaled in the ends of two normally horizontal bars 199 rigidly connected by a cross member 200 loosely mounted on the horizontal drive shaft 124. The arms 195 and 196 and bars 199 are so related and proportioned that when at rest in the normal inoperative position, the free upper ends of the arms lie in the plane of a record on the turntable 25.

Mounted in the upper ends of the arms 195 and 196 are two opposed grippers 201 and 202 (see Fig. 5) adapted to engage the record at diametrically opposed points. The gripper 202 comprises a multiple grooved end pad 203 of resilient material on a stud 204 mounted for free rotation in the arm 196. The gripper 201 is formed in its end with a transverse generally V-shaped notch 205 adapted to fit about the edge of the record, and is formed on a shaft 206 freely rotatable in the arm 195.

To reverse a given record, the gripper 201 is oscillated through 180°. The means for this purpose comprises a pinion 207 on the shaft 206, and meshing with a rack 208 formed on the upper end of an elongated bar 209. The latter extends longitudinally of and is slidably secured against the inside of the arm 195. A pin 210 projects inwardly from the mid portion of the rack bar 209 for engagement with the underside of the cover plate 35 to actuate the bar 209 in one direction and therethrough rotate the gripper 201 through 180° upon elevation of the side bars 199 as hereinafter described.

Projecting outwardly from the lower end of the rack bar 209 is a pin 211 adapted for engagement by an arm 212 freely suspended from the frame 32 to restore the gripper 201 to initial position before another record is taken from the magazine 29. The arm 212 normally rests in inoperative position against a stud 213 in the side brackets 125 of the frame 32, but is adapted to be actuated into engagement with the pin 211 on occasion by a pin 214 projecting outwardly from a gear 215 rotatable on the stud. A companion gear 216 is rotatable on a stud 217 in the side bracket 126 of the frame 32 directly opposite the gear 215. The gears 215 and 216 are connected respectively through gears 218 and 219 to the drive shaft 124.

The arms 195 and 196 are adapted for oscillation through rotation of the rock shaft 198, first upwardly to lift a given record from the turntable 25 and then either after reversal of the record or the discharge of the record and the selection of another record, downwardly back to initial position. The means for rocking the shaft 198 comprises a crank arm 220 thereon pivotally connected to a bar 221 rigid at one end with an elongated frame 222. This frame is mounted to reciprocate on the shaft 124 laterally thereof, and is suitably slotted to accommodate such movement. Secured to the shaft 124 and disposed within the frame 222 are two elliptical cams 223 and 224 with their major axes at right angles. The cams 223 and 224 coact respectively with two cam rollers 225 and 226 mounted respectively in opposite ends of the frame 222.

The cam 223 serves to return the arms 195 and 196 to initial position and hence has lobes of substantially equal length. The cam 224 has lobes of unequal length so that the arms 195 and 196 will be swung upwardly in alternate cycles a distance sufficient to permit reversal of a given record, and a relatively greater distance into position to grip a record in the magazine 29. It will be evident that each cyclic actuation of the gripping arms 195 and 196 requires rotation of the shaft 124 through 180°.

Provision is made for elevating the bars 199 during the record reversing operation, but not during the record changing operation. To this end, the gears 215 and 216 are provided on their inner faces respectively with rotary cams 227 which coact with overhanging cam abutments 228 on the related bars 199. Rotation of the cams 227 serves to swing the bars 199 vertically about the shaft 124 so as to elevate the pivot shaft 198 for the gripper arms 195 and 196 in removing a record for reversal from the turntable 25, and to lower the shaft 198 into initial position in replacing the record on the turntable. The cams 227 are so shaped that the foregoing action requires the rotation of the gears 215 and 216 through only 180°, and is not repeated in the succeeding rotation through the final 180°. The pin 214 is arranged to engage the arm 212 during the latter part of the final rotation. Counterweights 229 are provided to aid in swinging the bars 199.

Provision is made for moving the upper ends of the arms 195 and 196 toward and from each other to grasp or release a record at appropriate times. In the present instance, (see Figs. 6, 8 and 11), the lower ends of the arms 195 and 196 are pivotally connected respectively through toggle links 230 and 231 to two telescoping sleeves 232 and 233 slidable on the shaft 198 and relatively to each other. The sleeves 232 and 233 are formed on one end with opposed collars 235 and 236 beveled on their adjacent side faces to define a wedge-shaped groove 237. A pin 238 on the sleeve 233 extends outwardly through a longitudinal slot 239 in the sleeve 232. Disposed on the sleeve 232 is a coiled compression spring 240 abutting against the collar 235 and a loose collar 241 bearing against the pin 238, and hence tending to urge the collars toward each other so as to move the arms 195 and 196 apart beyond their normal gripping position.

A wedge 242 disposed between the collars 235 and 236 is movable into further engagement therewith to move the arms 195 and 196 positively into gripping position, and is sufficiently retracted to release the arms from engagement with the record at appropriate times. Preferably, the wedge 242 is formed on one end of a rod 243 which is reciprocable in a sleeve 244 formed in the cross member 200, and which is rigid with a forked bar 245 having bifurcated ends slidably embracing the shaft 124. A cam roller 246 is journaled in the crotch of the bar 245 and engages a rotary cam 247 fixed on the shaft 124. The roller 246 is held against the cam 247 by a spring 248 disposed between the sleeve 244 and a peripheral flange 249 on the rod 243.

The cam 247 is formed in its periphery with two diametrically opposed recesses 250 and 251 one or the other of which is always in registry with the roller 246 during the idle periods so as to release the record when on the turntable 25. Also formed in one side of the peripheral surface of the cam 247 between the recesses 250 and 251 is a recess 252 which is movable into registry with the roller 246 at an appropriate time to release the played record to the discharge receptacle 30 just prior to the grasping of a new record in the magazine 29.

Briefly stated, the operation of the record reversing and changing mechanism consists of two cycles. Upon closing the clutch 70 after playing the first side of the record or at will during the playing thereof, the shaft 124 is driven through one-half revolution. The cam recess 250 immediately moves out of registry with the roller 246 to advance the wedge 242 so as to cause the arms 195 and 196 to grasp the record. Upon continued rotation of the shaft 124, the cam 224 is effective to rock the shaft 198 so as to elevate the arms 195 and 196. At the same time, the cams 227 are effective to raise the bars 199 and the pivot shaft 198.

As a result of these movements, the record is held in an elevated position free to swing without interference. During the upward movement of the arm 195, the pin 210 engages the cover plate 35, and hence effects rotation of the shaft 206 through 180° to reverse the record. Meanwhile, the long dwell area of the cam 247 remains in engagement with the roller 246, thus holding the arms 195 and 196 in engagement with the record. The cam 223 and the cam 227 then act to return the parts to their initial position, and when the reversed record is repositioned on the turntable, the recess 251 permits withdrawal of the wedge 242 to release the record.

When the record has been played on both sides, the shaft 124 is rotated through one-half revolution as before. Thereupon, the cam 247 again causes the arms 195 and 196 to grasp the record. The long lobe of the cam 224 now serves to swing the arms 195 and 196 clear over to the record magazine. However, the cams 227 in this cycle do not elevate the pivot shaft 198. Hence, the arms 195 and 196 swing at a lower level. In the course of this movement, the recess 252 moves into registry with the roller 246, thus causing the arms 195 and 196 to release the played record directly over the discharge receptacle 30. The arm 212 also is actuated by the pin 214 to reverse the shaft 206 through 180°. Upon movement of the arms 195 and 196 into position to engage the foremost record in the magazine 29, the cam 247 is again effective to advance the arms into gripping position. Thereupon, the cam 224 is effective to return the arms to initial position. After the new record is positioned on the turntable 25, the recess 250 moves into registry with the roller 246 to retract the arms 195 and 196.

Résumé of operation

The operation of the phonograph will be evident from the foregoing description, and briefly summarized is as follows: Assuming that the indicator 135 has been adjusted for playing a plurality of records in series, and that a record is in the course of being played, when the tone arm 26 ceases its inward movement, it is effective through the non-set trip mechanism to close the clutch 70. The clutch 70 may also be closed at any time through manual actuation of the reject key 131.

The clutch 70 connects the spindle 37 to the drive disk 71 which is immediately effective to elevate the pickup 27. Elevation of the pickup 27 serves to close the switch 52 to increase the power of the motor 39. The disk 71 now is effective to swing the tone arm 26 outwardly. Shortly before the disk 71 completes one-half revolution, it is effective to close the clutch 105 so as to institute rotation of the disk 101. The latter immediately releases the detent 99 which acts to stop the disk 71 at the mid point of its revolution.

The shaft 102 now is driven through one complete revolution, and hence drives the shaft 124 through one-half revolution. The shaft 124 acting through the cam 247, the cams 223 and 224 and the cams 227 serves to effect a reversal of the record. Upon completing its revolution, the cam disk 101 retracts the detent 99 to effect closing of the clutch 70 whereupon the disk 71 completes its revolution. In its last half revolution, the disk 71 serves to return the tone arm 26 into initial playing position and to lower the pickup 27, thereby opening the switch 52.

Upon completing the playing of the second side of the record, the foregoing cycle is repeated, with the exception that the record is discharged and not reversed, and a new record is positioned on the turntable 25. When the last record of the series has been played and no new record is positioned on the turntable 25, the pickup 27 is lowered beyond its normal position thus causing the switch 51 to open, thereby stopping the motor 39.

Upon adjusting the indicator 135 into "repeat" position, the clutch 105 is rendered inoperative. Hence, the disk 71 will on each actuation be driven without interruption through one complete revolution to reposition the tone arm 26 and the pickup 27 for repeated playing of one side of a given record.

Upon adjustment of the indicator 166 into nonautomatic position, the tone arm 26 is not returned into position over the record, and hence the pickup 27 will be lowered below its normal playing position, thus causing the motor 31 to stop after each playing of one side of a record.

I claim as my invention:—

1. In a phonograph, in combination, a turntable, a shaft periodically rotatable through one-half revolution, a support, a pivotal member mounted on said support and normally extending to said turntable in position to engage a record thereon, a cage slidably mounted on said shaft and having a crank-arm connection with said member, two longitudinally spaced cam followers on said cage, and two cams each with diametrically opposed lobes secured to said shaft within said cage and respectively in engagement with said followers, the major axes of said cams being relatively perpendicular, the lobes of one cam being of unequal length to cause said member alternately to swing through different distances from said turntable.

2. In a phonograph, in combination, a turntable, a generally horizontal frame pivotally mounted for vertical movement, a periodically driven shaft, cam means driven from said shaft and supporting said frame, said cam means being operable upon every other actuation to oscillate said frame, and means carried by said frame and operable upon oscillation thereof to reverse a record on said turntable.

3. In a phonograph, in combination, a turntable, a periodically driven shaft, a generally horizontal frame pivotally mounted on said shaft, said frame having opposed side arms, two rotary cams driven from said shaft and supporting said arms, said cams being operable upon every other actuation to oscillate said frame vertically, and record transfer means mounted on said frame.

4. In a phonograph, in combination, a turntable, a periodically driven shaft, a generally horizontal frame pivotally mounted on said shaft, said frame having opposed side arms, two rotary cams driven from said shaft and supporting said arms, said cams being operable upon every other actuation to oscillate said frame vertically, a transfer member pivotally mounted on said frame and normally extending to said turntable for engaging a record thereon, and means connecting said member to said shaft and being operable upon every actuation of said shaft to oscillate said member.

5. In a phonograph, in combination, a vertically movable support, an arm pivotally mounted on said support, a rotatable record gripper in the free end of said arm, a pinion rigid and coaxial with said gripper, a rack gear slidable longitudinally on said arm and meshing with said pinion, and a fixed stop in the path of said rack gear and adapted to slide the latter to rotate said gripper upon upward movement of said support.

6. In a phonograph, in combination, a periodically driven shaft, a movable frame, means driven from said shaft and operable upon every other actuation of said shaft to reciprocate said frame, an arm mounted on said frame, a rotatable record gripper carried by said arm, a rack and pinion carried by said arm for rotating said gripper, a stop for actuating said rack in one direction upon movement of said frame in one direction, and means operable in timed relation with said first mentioned means to return said rack to initial position during the idle period of said frame.

7. In a phonograph, in combination, a turntable, a power driven shaft, a frame pivotally mounted on said shaft, a rock shaft journaled in said frame and parallel to said power shaft, two blocks secured to opposite ends of said rock shaft, two arms pivotally mounted in said blocks for movement toward and from each other, and normally extending to opposite sides of said turntable in position to engage a record, two telescoping sleeves slidable on said rock shaft and having opposed peripheral collars, links connecting said sleeves respectively to said arms, spring means tending to move said collars together to effect movement of said arms toward each other, a wedge pin disposed between said collars, spring means tending to retract said pin from said collars, and cam means driven from said shaft for holding said pin between said collars, said cam means being effective periodically to permit withdrawal of said pin.

8. In a phonograph, in combination, a straight guide track, a truck slidable along said track, said truck being formed with a plurality of parallel recesses extending transversely of said track and adapted to support a plurality of records, spring actuated means tending to advance said truck in one direction, stop means adapted for engagement with the foremost record to limit the movement of said truck, and upon successive removal of the records from said truck to permit a step-by-step advance of said truck, and means for successively removing said records.

9. In a phonograph, in combination, a vertical support, a track extending laterally from said support, a truck slidable along said track, said truck being formed with a plurality of parallel recesses extending transversely of said track, and adapted to support a plurality of records in generally vertical position with their lower edges resting on said track, spring actuated means tending to advance said truck in one direction, and stop means on the forward end of said track in position for engagement with the foremost record.

10. In a phonograph, in combination, a horizontal turntable, a vertical support spaced therefrom, a horizontal track mounted on said support and extending toward said turntable, the outer end of said track being struck up to define a stop, a truck slidable along said track and being formed with a plurality of transverse parallel slots for supporting a plurality of records in generally vertical position with their lower edges resting on said track, the rear sides of said slots being slightly inclined from the vertical, spring actuated means urging said truck toward said turntable, said stop being engageable by the foremost record in said truck for determining the position thereof.

11. In a phonograph, in combination, a turntable, a tone arm mounted for swinging movement over said turntable, a lever pivotally mounted intermediate its ends for engagement with said arm to swing the latter in one direction, a crank shaft in operative engagement with said lever, a pinion on said shaft, a gear sector in mesh with said pinion, and means periodically operable to oscillate said gear sector.

12. In a phonograph, in combination, a turntable, a tone arm mounted for swinging movement over said turntable, a drive disk periodically operable through one revolution, a link eccentrically connected to said disk, a lever pivotally connected to said link and movable thereby against said tone arm to swing the latter outwardly beyond initial playing position, and a second lever operatively connected to said link for movement into engagement with said tone arm to swing the latter inwardly to initial playing position.

13. In a phonograph, in combination, a turntable, a tone arm mounted for swinging movement over said turntable, a drive disk periodically operable through one revolution, a link eccentrically connected to said disk, a lever pivotally connected to said link and movable thereby against said tone arm to swing the latter outwardly beyond initial playing position, and a second lever operatively connected to said link for movement into engagement with said tone arm to swing the latter inwardly to initial playing position, the fulcrum of said second lever being shiftable to vary the extent of the inward movement of said tone arm.

14. In a phonograph, in combination, a turntable, a tone arm mounted for swinging movement over said turntable, a pickup pivotally mounted on said tone arm, a lever pivotally mounted on said tone arm and with one end in operative engagement with said pickup for elevating the latter, a fixed rock shaft, rack and pinion means for connecting said rock shaft to said lever, a cam on said shaft, a lever having a track on its free end, and means periodically operable for oscillating said last mentioned lever to move said track into engagement with said cam so as to elevate said pickup and support said pickup in elevated position.

15. In a phonograph, in combination, a turntable, a tone arm mounted for swinging movement over said turntable, a pickup pivotally mounted on said tone arm, a lever pivotally mounted on said tone arm and with one end in operative engagement with said pickup for elevating the latter, a fixed rock shaft, means operatively connecting said rock shaft to said lever, a cam on said shaft, a lever having a track on its free end, and means periodically operable for oscillating said last mentioned lever to move said track into engagement with said cam so as to elevate said pickup and support said pickup in elevated position.

16. In a phonograph, in combination, a turntable, a tone arm mounted for swinging movement over said turntable, a power drive, means for moving said tone arm into initial playing position, a primary clutch for connecting said power drive to said means, a non-set mechanism responsive to the movement of said tone arm and automatically operable to institute the operation of said clutch upon cesssation of movement of said tone arm after the playing of a record, a record reversing and changing mechanism, a secondary clutch for connecting said power drive to said last mentioned mechanism, means operable by said primary clutch for instituting the operation of said secondary clutch, and means for operating said secondary clutch to temporarily render said primary clutch inoperative.

17. In a phonograph, in combination, a turntable, a tone arm mounted for swinging movement over said turntable, a power drive, means for swinging said tone arm, a primary clutch for connecting said power drive to said means, means automatically operable to institute the operation of said clutch upon cessation of movement of said tone arm after the playing of a record, a record changing mechanism, a secondary clutch for connecting said power means to said mechanism, means operable by said primary clutch for instituting the operation of said secondary clutch, and means for operating said secondary clutch to temporarily render said primary clutch inoperative.

18. In a phonograph, in combination, a turntable, a tone arm mounted for swinging movement over said turntable, a power drive, means for swinging said tone arm, a clutch for connecting said drive to said means, said clutch tending to close, detent means for holding said clutch in open position and operable to open said clutch upon movement thereof through a predetermined degree, means for actuating said detent means to permit said clutch to close, a second detent means for opening said clutch at an intermediate point in its movement, and means for retracting said second detent means from said clutch.

19. In a phonograph, in combination, a turntable, a tone arm mounted for swinging movement over said turntable, a power drive, means for swinging said tone arm, a clutch for connecting said drive to said means, said clutch tending to close, detent means for holding said clutch in open position and operable to open said clutch upon movement thereof through a predetermined degree, means for actuating said detent means to permit said clutch to close, a second clutch tending to close, means for holding said second clutch open in idle position and operable to open said second clutch upon movement thereof through a predetermined degree, a second detent means for opening said first mentioned clutch at an intermediate point in its movement, said second clutch in idle position acting to hold said second detent means in inoperative position, and means operable by said first mentioned clutch for actuating said last mentioned means to institute closing of said second clutch, whereby said second detent means is rendered operable for a predetermined movement of said second clutch.

20. In a phonograph, in combination, a power drive, a drive element, a clutch for connecting said drive to said element, said clutch tending to close, detent means for holding said clutch open, said detent means comprising a movable actuating abutment, an intermediate abutment positioned for engagement with said actuating abutment, and means for actuating said intermediate abutment to move said actuating abutment, whereby said detent means is actuated to permit said clutch to close.

21. In a phonograph, in combination, a power drive, a drive element, a clutch for connecting said drive to said element, said clutch tending to close, detent means for holding said clutch open, said detent means comprising a movable actuating abutment, an intermediate abutment positioned for engagement with said actuating abutment, and means for actuating said intermediate abutment to move said actuating abutment, whereby said detent means is actuated to permit said clutch to close, and means for retracting said intermediate abutment out of the path of said last mentioned means to prevent actuation of said detent means.

22. In a phonograph, in combination, a power drive, a drive element, a clutch for connecting said drive to said element, said clutch tending to close, detent means for holding said clutch open, said detent means comprising a movable actuating abutment, an arm normally positioned for engagement with said abutment, a lever movable against said arm to effect movement of said abutment to actuate said clutch, a drive member movable periodically into engagement with said lever, and means for retracting said arm from between said abutment and said lever to render said clutch inoperative.

23. In a phonograph, in combination, a turntable, a tone arm movable over said turntable, a motor comprising constantly excited windings and normally unexcited windings for driving said turntable, means for moving said tone arm, means for periodically connecting said motor to said first mentioned means, and switch means for automatically effecting excitation of said normally unexcited coils when said last mentioned means is operative.

24. In a phonograph, in combination, a turntable, a tone arm movable over said turntable, a pickup pivotally mounted on said tone arm, means normally inoperative for elevating said pickup, means normally inoperative for swinging said tone arm with the pickup elevated outwardly, a motor for driving said turntable, said motor comprising constantly excited windings and normally unexcited windings, means operable after the playing of a record for periodically connecting said motor to said two first mentioned means, and switch means responsive to said first mentioned means for automatically effecting excitation of said normally unexcited coils to increase the power of the motor.

25. In a phonograph, in combination, a turntable, a tone arm movable horizontally over said turntable, a power drive, means including a drive element for swinging said tone arm outwardly, a clutch for connecting said drive to said element, said clutch tending to close, a spring actuated detent normally positioned to hold said clutch open, a pivotal base lever, a floating lever pivotal on said base lever and responsive to the inward movement of said tone arm, abutment means continuously operable from said drive, a hook operatively connected to said detent for actuating the latter to release said clutch, a lever system connecting said floating lever and said hook, and abutment means periodically effective to move said hook into the path of the first mentioned abutment means, said floating lever being effective upon movement of said tone arm inwardly to retract said hook from said first mentioned abutment means before engagement therewith.

26. In a phonograph, the combination of a turntable, a movable magazine for supporting a plurality of records in upright position, means for lifting the foremost record out of said magazine and transferring it to said turntable, means operable after the removal of said record to move said magazine to place the next record in position for removal and a stop engageable by said next record for determining the position of said next record.

JOSEPH W. BISHOP.